United States Patent [19]
Butler, Jr. et al.

[11] 3,708,686
[45] Jan. 2, 1973

[54] FREQUENCY COMPARATOR

[75] Inventors: Luther C. Butler, Jr., Garden Grove, Calif.; Robert S. Jamieson, No permanent address

[73] Assignee: Lorain Products Corp., Lorain, Ohio

[22] Filed: April 30, 1970

[21] Appl. No.: 33,208

[52] U.S. Cl. .....................307/149, 331/49, 307/233
[51] Int. Cl. .......................................................H02j
[58] Field of Search.............307/149, 232, 233, 295; 328/61, 63, 133, 134; 331/49, 55, 56

[56] References Cited

UNITED STATES PATENTS

| | | | |
|---|---|---|---|
| 3,297,955 | 1/1967 | Corey et al. | 331/56 X |
| 3,517,322 | 6/1970 | Lay | 328/133 |
| 3,431,510 | 3/1969 | Reis et al. | 331/49 |
| 3,329,905 | 7/1967 | Niertit et al. | 331/49 |
| 3,539,920 | 11/1970 | Boltz, Jr. | 307/233 |
| 3,289,097 | 11/1967 | Martin | 331/49 |

*Primary Examiner*—D. F. Duggan
*Attorney*—Gausewitz, Carr & Rothenberg

[57] ABSTRACT

A high precision timer employs a pair of redundant crystal clock generators of a type that will either fail dead or at lower frequency. Frequencies of the two clocks are compared and the faster of the two is selected to provide the desired timing. To select a point of precise, unambiguous and repeatable relative phasing between the two clock signals there is generated from one of the clocks a series of pairs of reference interval pulses with the pulses of each pair separated by a reference interval substantially equal to the width of one of the pulses. There is generated from the second clock a train of sighting pulses each having a width substantially equal to the interval between pulses of each pair. A specific relative phasing of the two clocks is then identified by searching for and signalling occurrence of a sighting pulse precisely within the reference interval of pulses of a pair. Relative frequency is then determined and end of a measurement interval signalled by occurrence of pulses produced from one clock out of consecutive alternation with pulses produced by the other clock. Structure and circuitry are also provided to indicate when one of the clock generators is too slow to use or is entirely bad.

30 Claims, 14 Drawing Figures

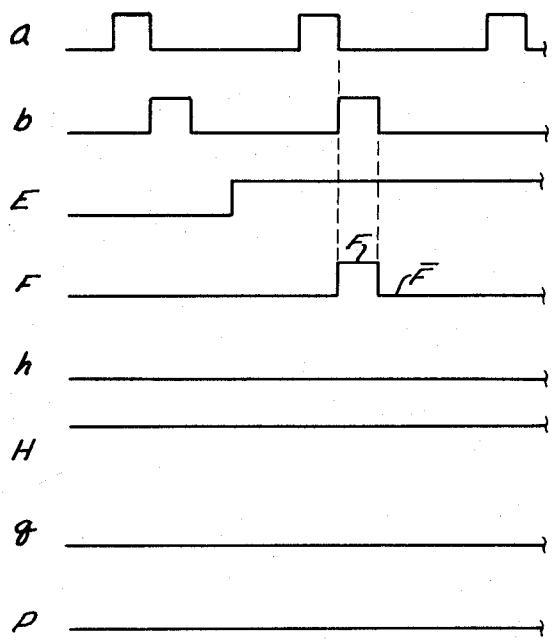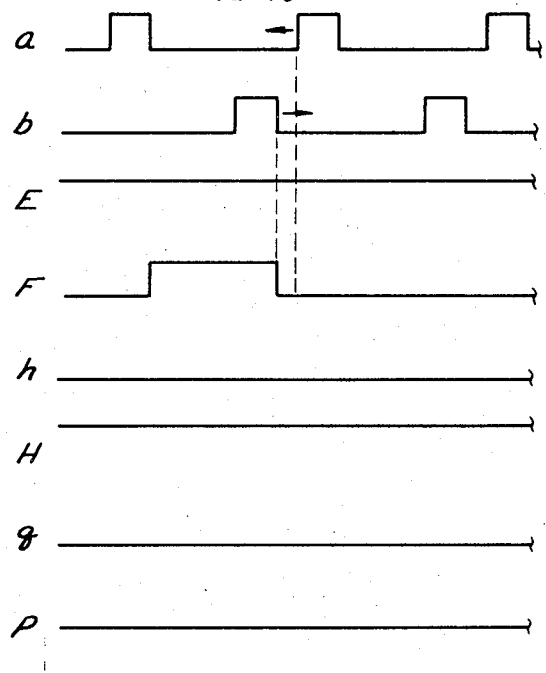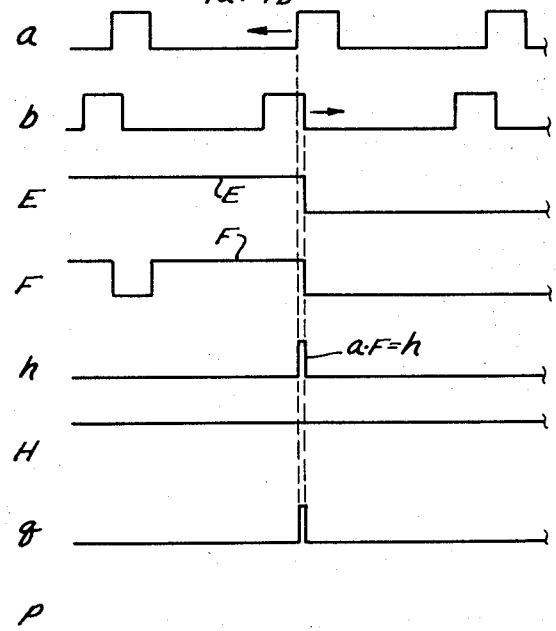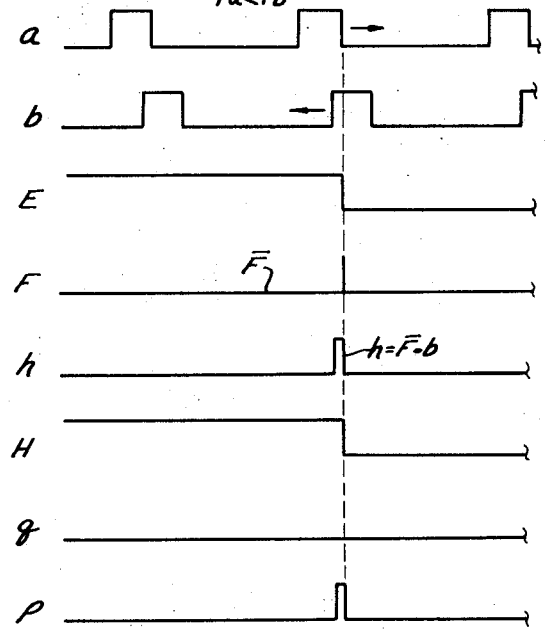

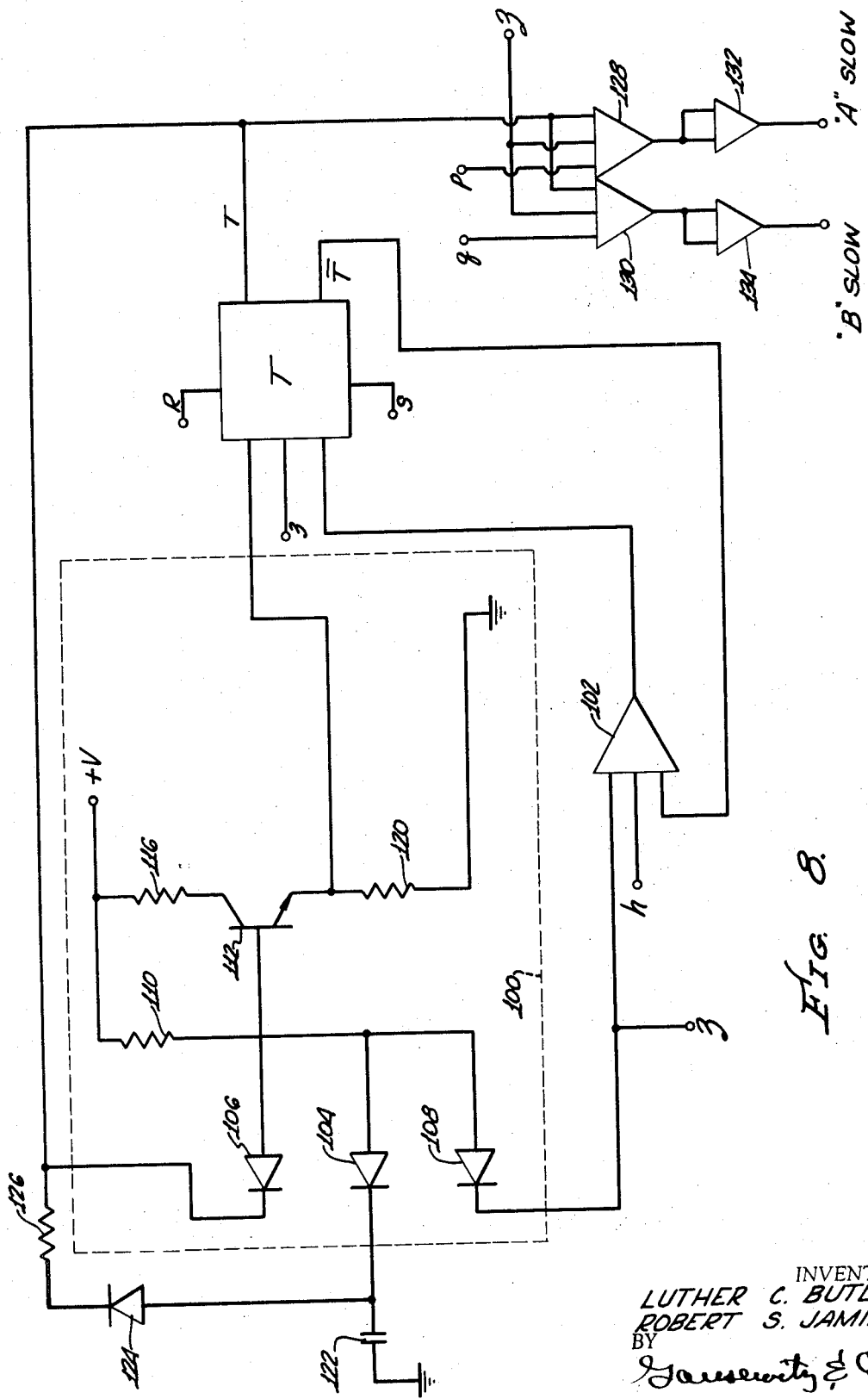

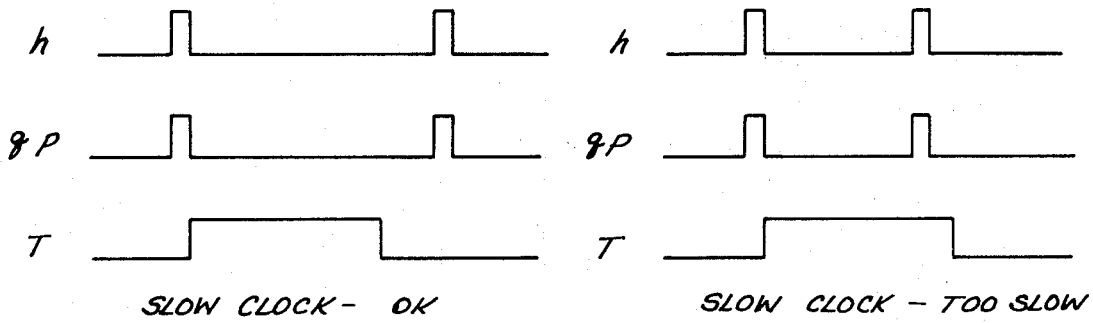
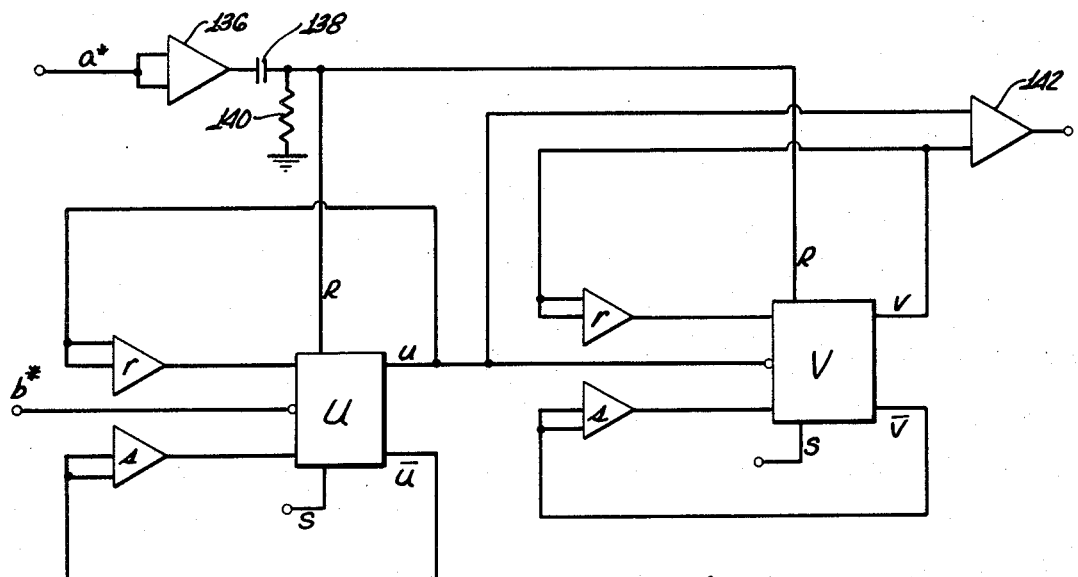
Fig. 11.

FREQUENCY COMPARATOR

BACKGROUND OF THE INVENTION

1. Field of the Invention

The present invention relates to timing systems and more particularly concerns a source of stable, high precision frequency that may be employed for the clocking or timing of computers, clocked inverter power systems, or other systems depending upon a highly reliable frequency source.

2. Description of Prior Art

Attempts to obtain increased reliability, accuracy and stability of frequency sources have been directed toward improvement of the clock generator itself, the oscillator circuitry and crystals employed for stabilizing the circuits. Although many complex and sophisticated systems requiring high reliability have employed redundant channels of information and operation, redundancy of timing apparatus has not been employed or suggested heretofore. Obvious advantages of redundancy of systems and components have not been available because of difficulties in making rapid comparison of two frequency sources of high precision and high frequency.

Comparison of two high frequency sources to determine which of the two has the higher or lower frequency and by how much, entails a number of problems, not the least of which is the provision of some means of assuring precision and accuracy of that one of the two sources to be used as the reference. Time required to make a meaningful measurement is another limiting factor. Given enough time, high frequency clocks may be compared, for example, by counting cycles of each over a selected interval and comparing the counts. The closer the two clocks are in frequency, the longer is the time required for a meaningful measurement. With clocks in MHz frequency ranges and with tolerable frequency differences of fractions of one percent, irreparable damage may have been done to the timed apparatus during the interval required for the measurement. Certain power systems and computers employing very high frequency timers can tolerate a poor timer for no longer than 16 timing pulses, thus requiring an exceedingly fast acting frequency measurement.

Conventional types of frequency measurement are not applicable in a system such as an uninterruptible power supply requiring a crystal oscillator having a stability of ± 100 parts per million. Conventional measurement of a difference in frequency of as little as one-half of one percent would indicate a clock that was well beyond the limits of tolerance for this type of system. If the clocks are fairly stable and accurate, such a large frequency differential will not occur. In fact, the frequency difference may well be under 100 parts per million between two normal high precision production clocks. In detection of the difference between frequencies of such precision clocks by the common method of detecting beat frequency between two pulse trains, it would be relatively easy to observe on an oscilloscope where two pulse trains are in phase and where they are out of phase. One could then time the interval between two successive points of a specific relative phasing of the two pulse trains. This would give a frequency measurement and also show to the eye the frequency that is higher. Nevertheless, with two substantially symmetrical square wave pulse trains having a beat rate of, for example, one in one million, such a display on an oscilloscope or oscillograph conveys little useful information. It is not possible to clearly discern a point where the two pulse trains are truly, exactly or even mostly in phase or out of phase. There will be hundreds of successive pulses of each train which will appear substantially identical as far as their phase relationship is concerned. The change in relative phase is so gradual as to be imperceptible.

This problem also applies to those circuits that attempt to distinguish in-phase or out-of-phase conditions. A rather crude attempt to identify in-phase or out-of-phase conditions would employ the conventional AND gate to recognize when two clocks such as clock A and clock B are coincident, and provide an output. In such a situation, there may be thousands of such outputs from a coincidence gate, each output in sequence getting narrower as the pulses of the two clocks overlap less and less. An improvement on such an arrangement would be to combine the conventional AND gate with a not-AND gate, the latter indicating the absence of a coincidence between pulses from the two clocks. In this manner, the existence of an output from the AND gate together with the absence of an output from the not--AND gate would mean that the pulses were totally coincident, overlapped each other fully and had no part that did not extend on either side of each pulse. Such a point could be used as the start of the beat interval and its recurrence could be employed as the end of the identified beat interval. This arrangement, however, is entirely dependent upon geometry of the two pulse trains. That is, each must have a steep leading and trailing edge and must be of exactly equal width. If one pulse train is somewhat wider than another, the desired relative phase point will not occur. It is not practical or feasible with present day techniques to make both pulse trains have pulses of exactly the same duration. Furthermore, at high frequencies the pulses do actually have finite rise and fall times whereby the AND or not-AND gates operate at certain threshold levels. To arrange a circuit so that all of these thresholds and the rise and fall times will agree and coincide would be a nearly impossible circuit design task.

Still another way to identify an unambiguous precisely repeatable point of relative phase between the two high frequency clock signals would be to deliberately increase the pulse width of pulses of one of the clocks and use AND or not-AND gates to find a time when the pulses of the other clock entirely coincide with a pulse of the first but with no part of the second extending beyond. Nevertheless, here again there are hundreds or perhaps thousands of these conditions that would exist in sequence. In such an arrangement, of course, one could accept the very first coincidence in such a group as the start of a beat frequency cycle and measure the interval until the next such group occurs. In that way, the start of the beat cycle would not be exactly at the in-phase point, but would be going from the same relative point each time. Nevertheless, in practice this is not feasible since electrical noise causes a great variation in starting and ending points of such a group of coincidence pulses. The starting and ending points of such an arrangement are most sensitive to noise in that these points the smaller width pulse is also entirely within the greater width pulse and is either entering or leaving the latter, wherefore, it is most sensitive to noise. Circuits employing this approach have given erratic results in that the presence of noise at the beginning of the beat cycle may add many spurious pulses or subtract equal numbers of such spurious pulses at the beginning of the next cycle.

SUMMARY OF THE INVENTION

In carrying out the principles of this invention in accordance with the preferred embodiment thereof, timing apparatus is provided comprising first and second redundant periodic generators, such as oscillators, having nominally equal frequencies. The two frequencies are compared by a unique frequency comparison arrangement and that generator having the higher frequency is selected to provide the output of the apparatus. For measurement of relative frequency of a pair of redundant oscillators, for example, there is generated from the first oscillator a series of pairs of gunsight or reference pulses separated from each other by a gunsight or reference interval. A series of sighting pulses is generated from the second oscillator, each of the sighting pulses having a duration substantially equal to the gunsight interval and means are provided to indicate occurrence of one of the sighting pulses in one of the gunsight intervals to thereby signal occurrence of a precise phase relation between the oscillators. An indication of which of the oscillators is faster is then provided upon occurrence of two consecutive pulses from one oscillator without occurrence of an intervening pulse from the other oscillator.

BRIEF DESCRIPTION OF THE DRAWINGS

FIGS 7a, 7b, 7c and 7d show various relations of pulse trains and other signals occurring during operation of the frequency difference indicator of FIG. 6, FIG. 8 shows details of the slow frequency clock monitor, FIGS. 9 and 10 show wave forms illustrating operation of the slow frequency monitor of FIG. 8, and FIG. 11 illustrates the arrangement of a bad clock detector.

DESCRIPTION OF THE PREFERRED EMBODIMENT

Figure 1:
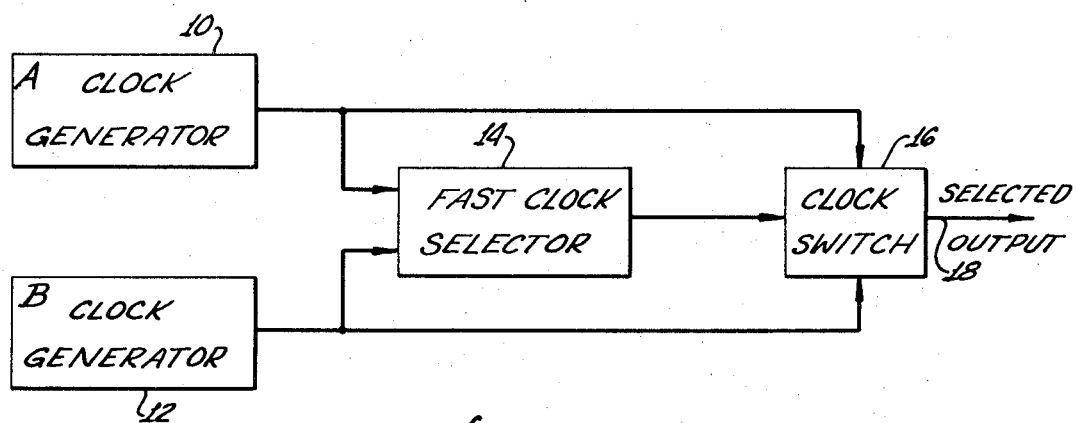
FIG. 1 is a block diagram of the redundant clock system according to principles of this invention.

It is well known that the advantage of redundancy of apparatus resides in the fact that one of the two redundant systems is still available for operation after failure of the other whereby changes of total failure are considerably minimized. Accordingly, in the use of redundant systems, it becomes necessary to distinguish between the two redundant devices or systems and identify that which is operating in the mode most closely following required parameters. If two crystal clock generators are provided, for example, it is not sufficient merely to employ one and then upon noting a failure of the first to switch to the second. It is always possible in such a situation that the second clock, the standby clock is this hypothetical situation, will have first failed, so that failure of the clock in use will totally disable the system. It is preferable in a redundant system to continually monitor each of the two clocks and distinguish between them as to accuracy and precision of frequency output. It would be desirable to use one clock to check the operation of the other. Nevertheless, before one can call either of the clocks a reference, some check of the clock with respect to still a third clock as a reference could be required.

With the use of crystal controlled oscillators, failure of the oscillator is dependent to a large extent upon operation of the crystal. Probable failure modes of a crystal oscillator include those in which one crystal clock could fail dead high, or dead low, or slip or jump to a lower or higher frequency. However, crystals of certain cut such as the Delta-T cut are available such that failure by slipping or jumping to a higher frequency is not possible. Such a crystal of the proper cut, operating in the fundamental mode in an oscillator incapable of operating at any overtones, would have only two failure modes. The first is a fracture of the crystal or some electronic failure such that the crystal oscillator ceases to function. Detection of such a failure is relatively simple, generally, comprising some sort of pulse dropout detector which can switch out the defective crystal oscillator after a given number of pulses are missed. The faster that such a dead clock is detected the better so that the second crystal oscillator in a redundant system can be switched in to minimize the "-down" time of the apparatus. In the particular case involving an uninterruptible power supply wherein a high frequency crystal oscillator having a frequency such as 1.152 MHz is employed to derive an ultimate signal of 360 Hz, missing a number of pulses of the crystal oscillator will not appreciably affect the operation of the system that is timed by the oscillator. Accordingly, such a failure mode is not a difficult problem where an exceedingly high frequency crystal is employed.

The second failure mode of such an oscillator is a considerably more difficult failure to identify. This failure is slowing of the oscillator frequency. If the container enclosing the crystal loses its hermetic seal, dampness may enter to cause the crystal to soften and slow the frequency. Further, some fracture modes of the crystal may cause a sight weakening of the effective spring rate of the crystal without concomitant decrease in frequency. An increase in frequency due to aging or mechanical problems is not possible with the crystal. It is not possible for such a crystal to increase frequency except by losing its mass. In a crystal of proper construction, a loss of some of the mass entails a loss of conductivity through the crystal whereby the entire oscillator will cease to operate. Accordingly, detection of the second mode of failure, the slowing or decrease of a frequency depends upon measurement of crystal frequency. Such a measurement in a redundant system employing two clocks would have to be a relative measurement since there is no reference available.

Given the premise that neither clock will fail to an out-of-tolerance higher frequency, and that both will not fail in any manner at the same time, the philosophy of the present invention employs the higher frequency clock as the reference. With such a system the fast clock is employed for timing the system. The slow clock is used as a backup clock. The slow clock is checked against the fast clock for occurrence of too low a frequency. Both clocks are checked for fail to zero condition or dead condition. Separate power supplies are employed and failure of any one clock in any mode is alarmed and the system switches to the remaining clock.

GENERAL SYSTEM

As indicated in FIG. 1, first and second crystal clock generators 10 and 12 are employed, substantially alike in all respects including structure and frequency. Although crystal oscillators are preferred as the clock generators, any type of suitably stable and precise periodic generator may be employed to provide the two redundant timing sources employed in carrying out this invention. The frequencies of the two clocks are compared and a fast clock selector 14 chooses the clock with the higher frequency to enable a clock switch 16 which accordingly provides at the output 18 the clock signal of higher frequency. The measurement, of course, is made on a relative basis and assuming that the oscillator with the higher frequency is good, or at least the better of the two. If both clock generators had leaked it would be most likely that the oscillator with the higher frequency has leaked the least since these can suffer a degradation of operation only by decreasing in frequency. The probability of both oscillators leaking or decreasing in frequency is relatively small and may be minimized by proper maintenance and periodic frequency measurements. Accordingly, it is necessary only to compare frequencies of the two redundant crystal clocks and to choose that which has the higher frequency in order to safeguard against the second type of crystal clock failure, frequency decrease.

Measurement of frequency or comparison of frequency of two oscillators in accordance with principles of the present invention is based upon the identification of two conditions. The first of these conditions is detection of a meaningful, non-ambiguous and repeatable point at which to start a measurement. Such a point, of course, is a clearly identified occurrence of a unique relative phase between the two clock signals. The second condition required for relative frequency comparison is detection of the occurrence and direction of a relative phase shift between the two. In other words, a unique relative phase is first identified and then a change in such relative phase is identified.

Clock generators 10 and 12 produce square wave pulse trains indicated at A and B (FIG. 2) having a relatively high nominal frequency each of the exemplary 1.152 MHz. A series of gunsight, reference pulses or pulse pairs $a$ and $a^*$ are generated to provide a reference interval or notch therebetween into which will fit a sighting pulse $b$ that is generated from the second clock pulse train B. Thus a repeatable, unique, relative phasing of the two clock trains A and B occurs upon occurrence of the specific sequence of pulses $a-b-*$. When such a sequence occurs, a measurement interval is started. The measurement is terminated when pulses from one clock occur out of consecutive alternation with pulses of the other clock.

Figure 2:
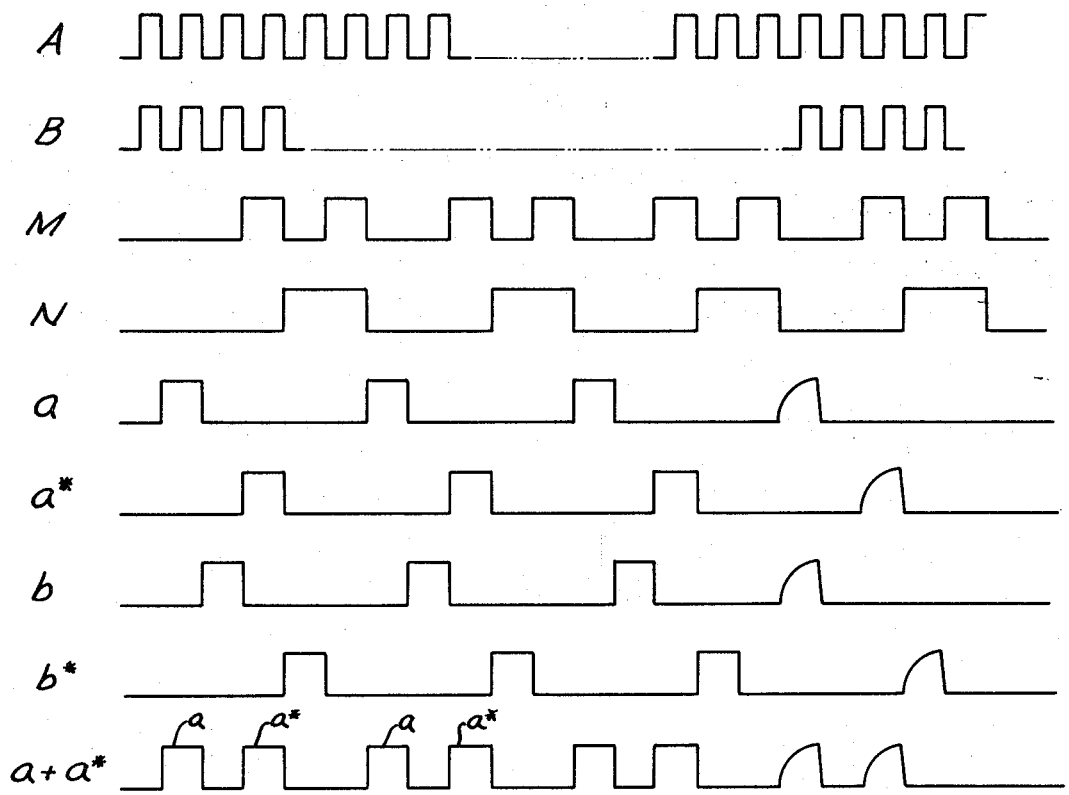
FIG. 2 illustrates certain wave forms useful in understanding the operation of the system of FIG. 1.

A phase reference or notch generator 22 (FIG. 3) is triggered from the clock train A and produces two separate pulse trains $a$ and $a^*$ also illustrated independently as a double pulse train $a + a^*$ shown in FIG. 2 (where + indicates logical OR). A second and substantially identical phase reference generator 24 is triggered from the clock train B to produce first and second pulse trains $b$ and $b^*$ also illustrated in FIG. 2. Not that both $a^*$ and $b^*$ pulses are each separated from the corresponding pulses $a$ and $b$ respectively by an amount not substantially greater than the width of each of these pulses as will be more particularly described below. The pulse train $b^*$ is not necessary for operation of the relative phase detector but, as will become apparent as the description proceeds, this pulse train is employed for other purposes. The two reference pulse trains $a$ and $a^*$ and the sighting pulse train $b$ are fed to a relative phase detector circuit 26 which identifies the unique point of relative phasing, namely, the sequence $a-b-*$ and provides an enable output E to enable operation of a fast clock or relative frequency sense detector 28.

The sense detector 28 starts operation upon occurrence of the identified point of unique relative phasing and then, in effect, detects when two consecutive pulses of one train occur within a time interval that is less than the interval required for occurrence of two consecutive pulses of the other train. Stated otherwise, the relative frequency sense detector is enabled when pulses of the two trains are in consecutive alternation ($a$ then $b$, then $a$, then $b$, etc.). It identifies when the pulses occur out of such consecutive alternation and which train so occurs first. A signal $q$ is produced indicating clock 10 is the faster. An output signal $p$ is produced to indicate clock train B is the faster. In either case, the end of measurement signal $h$ is produced to reset the relative phase detector 26 and enable the start of the search for a new sequence of $a-b-a^*$, which is the relative phase reference point.

Figure 6:
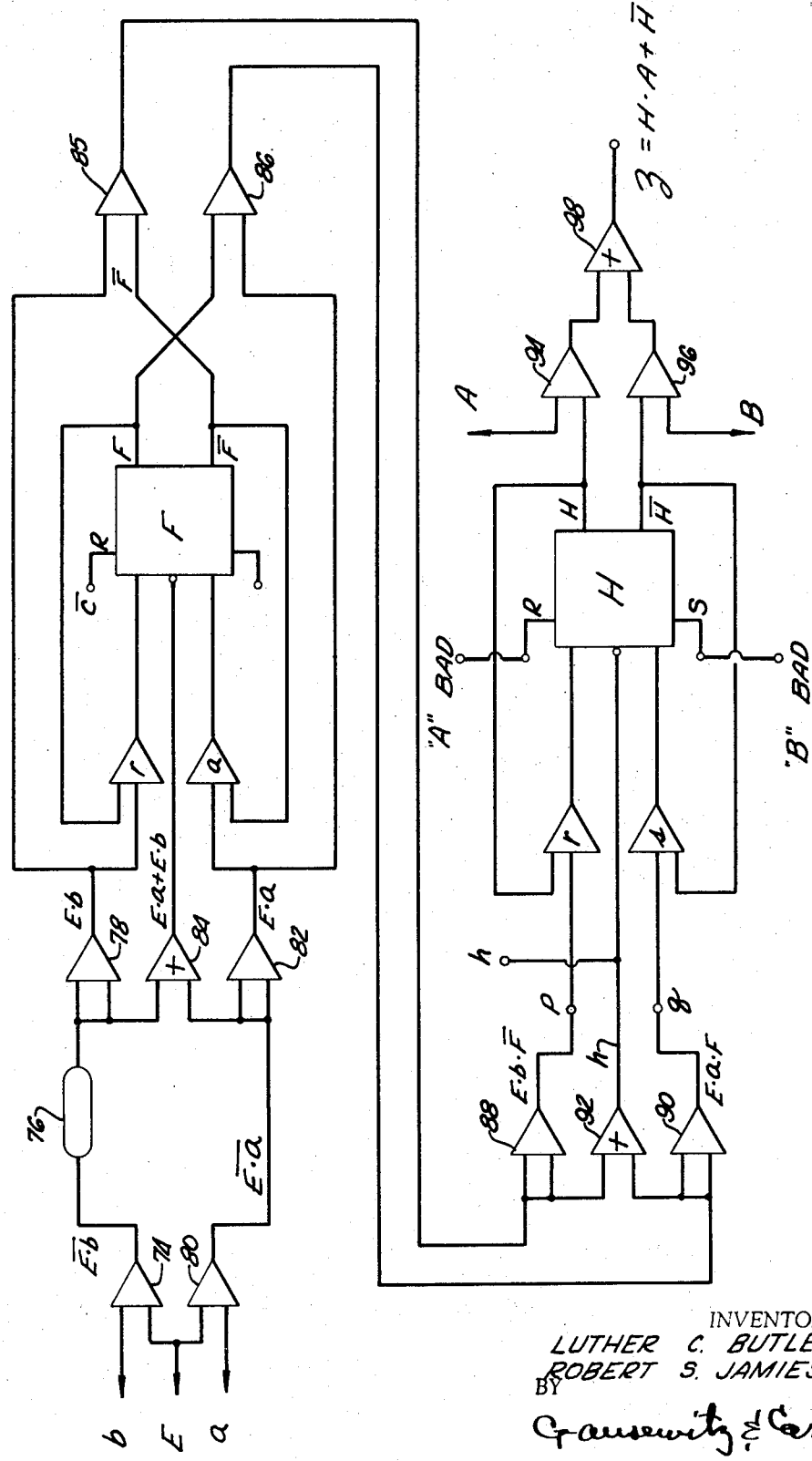
FIG. 6 shows a circuit for indicating the sense of frequency difference.

Although a number of ways are available to signal end of the measurement and determine which clock is the faster of the two, the above described operation is preferred and illustrated in further detail in FIG. 6.

Both clock pulse trains A and B are fed into a clock switch 30 comprising a flip-flop memory which is set to one condition by the signal $q$, indicating train A is fast, and reset to a second condition by the signal $p$ indicating that train B is fast. The clock switch will remain in one of these two states until an appropriate one of the signals $q$ or $p$ is received, forcing it to change states. Accordingly, if clock A is fast, for example, clock train A will be produced at the output of the clock switch until the relative frequency sense detector 28 determines that clock B has become the faster, whereupon the switch is operated by the signal $p$ to provide the clock train B at the output of the clock switch.

Having determined which clock is the faster of the two, it is possible to make measurements on the slower clock and turn in an alarm if necessary, even though the slow clock is not being used. If it were too low for use in an emergency, redundancy would be lost. Accordingly, it is advantageous to turn in an alarm when the slow clock approaches a low condition. Available crystals have initial grinding tolerances of 100 parts per million and a stability of 100 parts per million. Accordingly, one may assume that good clocks will be within ±400 parts per million, whereas actual output frequency could vary as much as 8,333.33 parts per million without causing a problem in the frequency timing system of common computers. For a gross low frequency check of the standby clock, one may set a warning level at 1 to 2,000 parts per million difference in frequency. In fact the frequency difference could drift by as much as 100 percent and still give an adequate signal that the clock is bad. Accordingly, the signals $q, p, h$, and the output of clock switch 30 are fed into a slow frequency monitor 32 that, in effect, compares the interval between successive occurrences of the end of the measurement interval signal $h$ with a preselected minimum time interval established by the monitor 32. If a second signal $h$ should follow a first signal $h$ by a shorter interval, it is known that the frequency difference is too great and the standby clock is too slow. Use of the signals $q$ and $p$, as more particularly described below, enables identification of the slower of the two clocks whereby the monitor 32 will provide one of two signals indicating either A or B is slow in the appropriate situation.

In order to further monitor the clock pulse generators to indicate a dead clock or a clock failed in 1 or 0 condition, bad clock detectors 34 and 36 are employed. In effect, these respectively count a given number of pulses $a^*$ and $b^*$ and reset on each occurrence of $b^*$ and $a^*$ respectively. For example, if a number such as three of the pulses $a^*$ is counted in the bad clock detector 36 before occurrence of a second pulse $b^*$, the detector provides an alarm signal indicating that the clock generator 12 is bad. The A or B bad signals are fed directly to the clock switch 30 to place this switch in condition to pass the signal from the good clock train. If deemed necessary or desirable, additional bad clock generators, not shown, identical to those indicated at 34 and 36 will be provided for monitoring the pulse trains $a$ and $b$ and also operating the clock switch 30 if a bad clock is detected in one of these trains.

PHASE REFERENCE (NOTCH) GENERATOR

Figure 3:
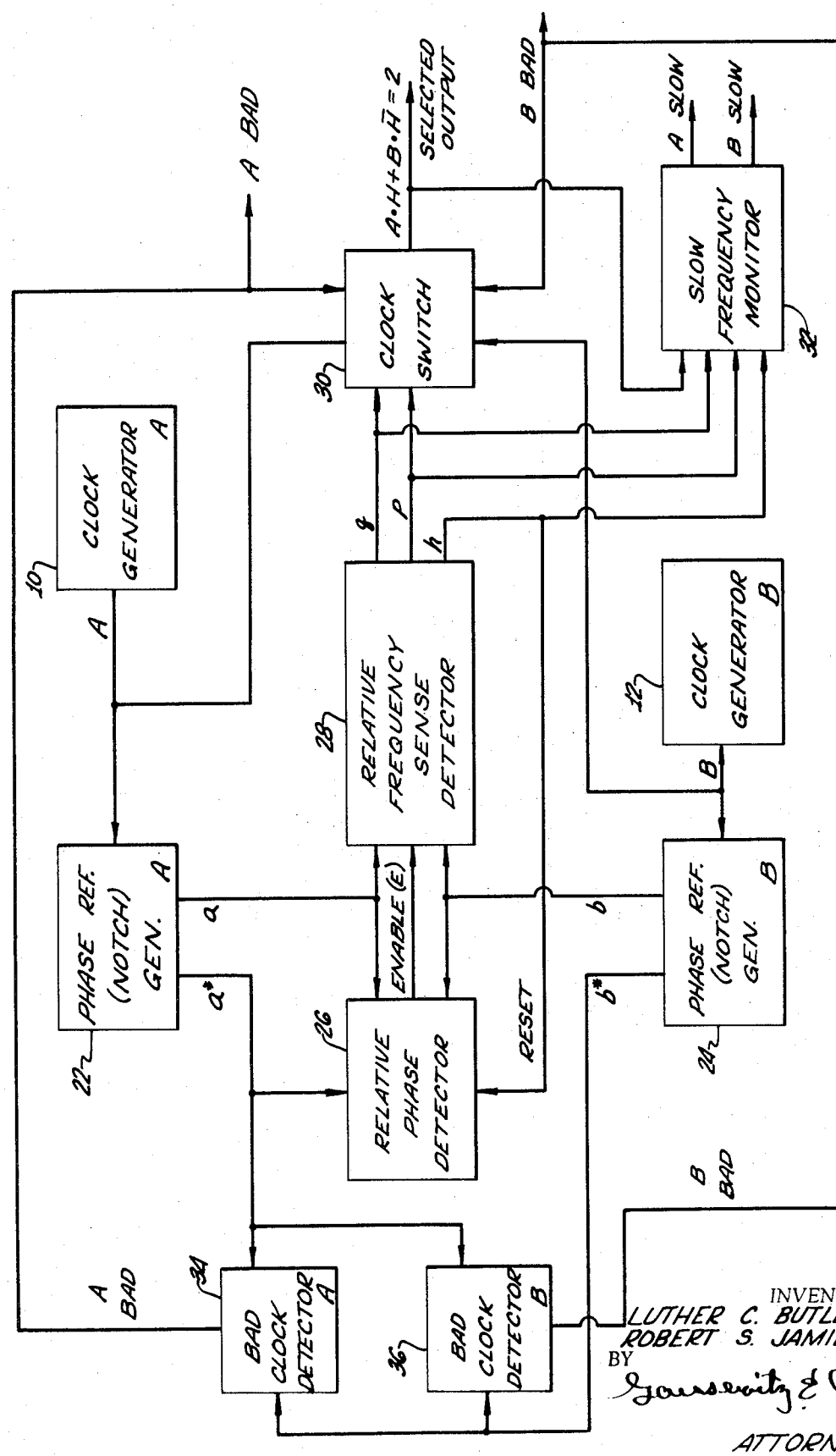
FIG. 3 is a block diagram showing additional details of the system of FIG. 1.

The phase reference or notch generators 22 and 24 of FIG. 3 are each substantially identical to the other except for different inputs and outputs. The generator 22 for the clock train A is illustrated in detail in FIG. 4. It will be readily appreciated that a number of different arrangements are available and well known for generating from the pulse train A first and second pulse trains $a$ and $a^*$ wherein the train $a^*$ is delayed with respect to the pulse train $a$ by the width of one of these pulses. Nevertheless, it is convenient to achieve this dual pulse train, a series of pairs of pulses separated from each other by the width of each, by use of a divide-by-five counter together with appropriate gating. The counter comprises a plurality of flip-flops M, N, and O of the "JK" type each having a direct set terminal S such as indicated at pin 40 for flip-flop M and a direct reset terminal R at pin 38. Each flip-flop also has a set and reset input from two input NAND gates designated as set gate $s$ and reset gate $r$, respectively. The flip-flops, as well known, produce mutually exclusive outputs indicated for flip-flop M as the signal M and the signal $\overline{M}$. Likewise, the outputs of flip-flop N and N and $\overline{N}$ and of flip-flop O are O and $\overline{O}$. When the flip-flop M is set, for example, M is high and $\overline{M}$ is low; and when reset, M is low and $\overline{M}$ is high. In the logic employed herein a positive signal, on the order of +1 to +2 volts, is considered true and the 0 volts or ground signal is considered false or low. Each of these conventional flip-flops has a clock or triggering input $t$. Each of the set and reset input gates has two inputs 11, 13 and 14, 15 which, when high, enable the input gates and allow the flip-flop to be toggled or to change its state when the clock or triggering input $t$ goes low. That is, the set or reset gate that is enabled by a high at its two inputs will provide a signal that allows the flip-flop to be set or reset upon the fall of the clock input $t$ if it is not already in such condition. The direct set and reset terminals are responsive to steady-state low signals to shift and/or hold the flip-flop to and in the set or reset state. The set and reset input gates are enabled by high signals to cause the flip-flop to be toggled on the fall of the clock signal thereto. Typical flip-flops of the type described are sold as microcircuit chips designated MC945FG, MC845F,P,G, MC948F,G, MC848F,P,G, and described in "Integrated Circuit Data Book", First Edition, August 1968, Motorola Semi-Conductor Products, Inc., and diode-transistor micrologic integrated circuits, Nos. 9945, 9948 and 9111, manufactured by Fairchild.

Figure 4:
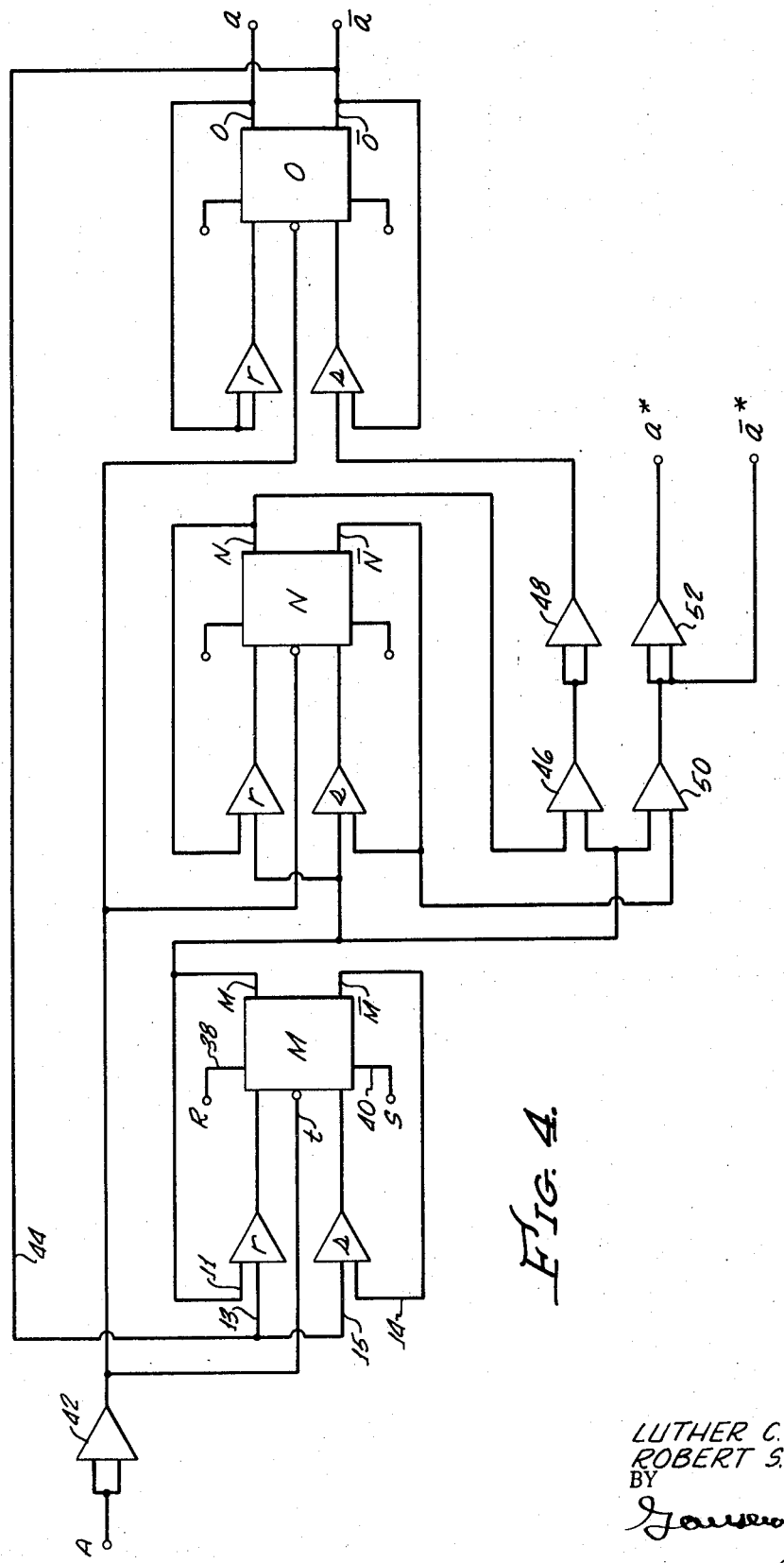
FIG. 4 shows details of a circuit for generating pairs of gunsight pulses.

The NAND gates are conventional coincidence circuits for steady true (high) signals, and operate as conventional OR circuits for steady false (low) signals. For true signals, the NAND gate will provide a low output, an inverted output, when and only when, all of the inputs thereto are high. When any one of the inputs thereto is low, the output of the NAND gate is high. The flip-flops and gates employed in the counter of FIG. 4 are typical of and identical to flip-flops and gates employed in the rest of this system, except where differences are specifically delineated.

The clock train A is fed as both inputs to a NAND gate 42 which provides a buffering of the oscillator output and provides a triggering input to each of the flip-flops M, N, and O. Each flip-flop input gate has one input thereto from the opposite flip-flop outputs whereby the flip-flop will be set or reset by the clock input only when in the reset or set condition respectively. A second input to both the set and rest gates of flip-flop N is provided via line 44 from the $\overline{O}$ output of flip-flop O. A second input to each of the set and reset gates of flip-flop N is provided from the true output side M of flip-flop M. A second input to the reset gate of flip-flop O is provided by the feedback of the signal O, and the second input to the gate of flip-flop O is provided at the output of a pair of NAND gates 46, 48 which are arranged to cause this modulo 8 counter to divide by five. NAND gate 46 has a first input from the M side of flip-flop M and a second input from the N side of flip-flop N. A second NAND gate 48 inverts the output of NAND gate 46 to provide the second input to the set gate of flip-flop O. Accordingly, with this arrangement, the output of flip-flop O comprises the pulse train $a$ as illustrated in FIG. 2. Also illustrated in FIG. 2 is the output M of flip-flop M and the output N of flip-flop N.

The three pulse trains M, N, and a, collectively indicate the logic of this divide-by-five circuit.

To provide the delayed pulse train a*, that is, to provide, in effect, the series of pulse pairs a, a*, an additional NAND gate 50 is provided having a first input from the M output of the flip-flop M and a second input from the N̄ side of flip-flop N. The output of NAND gate 50, accordingly, comprises the pulse train ā* and when fed to and inverted by a second NAND gate 52, provides the delayed pulse train a*. Thus the notch generator and divide-by-five circuit of FIG. 4 provides one pulse a* for each fifth one of the pulses of train A. Each of the pulses a and a* has a width equal to one cycle of the clock train A and the two are spaced apart by an interval equal to one cycle of the clock train A. Note that the pulse width of trains a and a* and the interval between these do not have to be particularly exact. The actual wave shape shown schematically as square for the first three pulses of each of these trains is actually rounded off as indicated by the last illustrated pulses in certain lines of FIG. 2. In fact, in an actual embodiment, the rise time of the pulses such as a, a*, etc., occupies about two-thirds of the pulse width. At this point, it may be noted that, where the frequency of the clock train A is 1.152 MHz, the width of pulses a and a* and the time interval therebetween, is on the order of 800 to 900 nanoseconds.

Having described in detail the notch generator and the divide-by-five circuit for pulse train A, it is noted that the notch generator 24 for pulse train B is substantially identical to that illustrated in FIG. 4 differing only in that the generator 24 receives the pulse train B and provides the two relatively delayed output pulse trains b and b* as indicated in FIG. 2. Although pulse b* is not used in the relative frequency sense circuit 28, it is convenient to employ identical circuits for generators 22, 24.

As illustrated in FIG. 2, the pulse b having a width substantially equal to the width of pulse a and the width of pulse a*, and also substantially equal to the interval between the pulses a and a* just fits between the latter and overlaps neither one when so positioned. It is preferred that the sighting pulse b does not have a duration that is significantly greater than the notch interval. This pulse can be a little wider because of the threshold of the various gates and the relatively slow rise time of the pulses. On the other hand, pulse b may be quite narrow relative to the width of the notch interval. It is possible to narrow pulse b by using a pulse narrowing device such as a monostable multivibrator, whereby noise that modifies rise and fall times of the various pulses would have little effect. However, in view of the actual wave shape of these pulses as indicated by the pulse shapes at the end of certain lines in FIG. 2, it is found that even in a situation where the widths of all three pulses, a, b, and a* of a sequence, are substantially equal and equal to the space between a and a*, the pulse b will still fit well in the reference notch and does not come close enough to either side to overlap into both. In practice this is due in part to the finite sensing levels of the gates that are employed.

RELATIVE PHASE DETECTOR

It will be seen from the description of FIG. 4 and the waveforms of FIG. 2 that the pulse trains a and a*, being derived from the same clock, will always have a fixed phase relationship with respect to each other. That is, each will be separated from the other or pulse a* will always follow pulse a by one interval of clock pulse train A (the width of pulse a). Although, in the described embodiment each pulse a will follow each other pulse a by four such intervals, the spacing between successive pairs is but a matter of choice or design. Thus the double pulse train a and a* serves as a repeatable gunsight interval or notch into which the sighting pulse b will fit at a single, repeatable, unambiguous condition of relative phase between the A and B pulse trains. Heuristically, the relative phase detecting operation is similar to the procedure followed in the sighting of a rifle wherein the blade (pulse b) at the front of the barrel is lined up to a position between the double blades or notch (pulses a – a*) at the rear sight, adjacent the eye of the user.

The relative phase detector 26, shown in detail in FIG. 5, comprises a group of sequentially operable flip-flops L, K, and E, each of the type previously described in connection with FIG. 4, as are all of the flip-flops employed herein, each having reset input gates disabled by a fixed connection to ground, and all having a direct reset input from the C̄ output of a clear flip-flop C. Flip-flop L is toggled, that is, switched to its set state (the grounded input to reset gate prevents operation thereof), by a triggering input from the pulse train a. The second flip-flop in this sequence detector, flip-flop K, has its set gate enabled by the output L which is true when flip-flop L has been set. Flip-flop K then can be toggled upon fall of its triggering pulse which is supplied from the train b. The final flip-flop, E, in the sequence detector, has the set input gate thereof enabled by the output K from the K flip-flop which is high when the latter has been set. Thus flip-flop E may be set by the fall of its clock input a*. The output of flip-flop E, the enable signal E, is fed to enable the relative frequency sense detector or fast clock detector 28 of FIG. 3.

The L, K, and E flip-flops described will signal occurrence of a proper sequence. Nevertheless, it is necessary that this signalling occur only if all three flip-flops are set in sequence without the occurrence of any one of several improper conditions. Accordingly, the sequence flip-flops are reset or cleared if these improper conditions occur. It will be recalled that all that is required to provide the enable signal E is the occurrence of the pulses a, b, a*, in sequence. This sequence is employed as the unique and repeatable start point in a measurement interval. However, if a pulse b exits at all in coincidence with pulse a, or at all in coincidence with pulse a*, an improper condition exists and no proper sequence can occur. In other words, whenever there is any overlap of pulse b with either of pulses a or a*, the sighting pulse is not yet in the gunsight notch. Furthermore, once b passes either pulse a or pulse a* going left or right (in the case of higher or lower frequency, respectively) there could be another improper condition wherein pulse b does not coincide with either of pulses a or a* (e.g., the improper sequence a*–b–a exists). Thus, the sequence enabling flip-flops L, K, and E must be disabled and cleared if a* should occur before b, or if there should be an overlap. It is also necessary to clear the sequence detector flip-flops for the start of a new measurement. Accordingly, there are three conditions for a pre-enable (during search for a sequence) clear and another condition for post-enable (after detection of a sequence) clear. For reasons to be described in connection with the relative frequency sense detector of FIG. 6, the pre-enable clear is a fast clear, operating on the leading edge of a positive going pulse, and the post-enable clear is somewhat delayed, or slower, operating on the trailing edge of the pulse.

Figure 5:
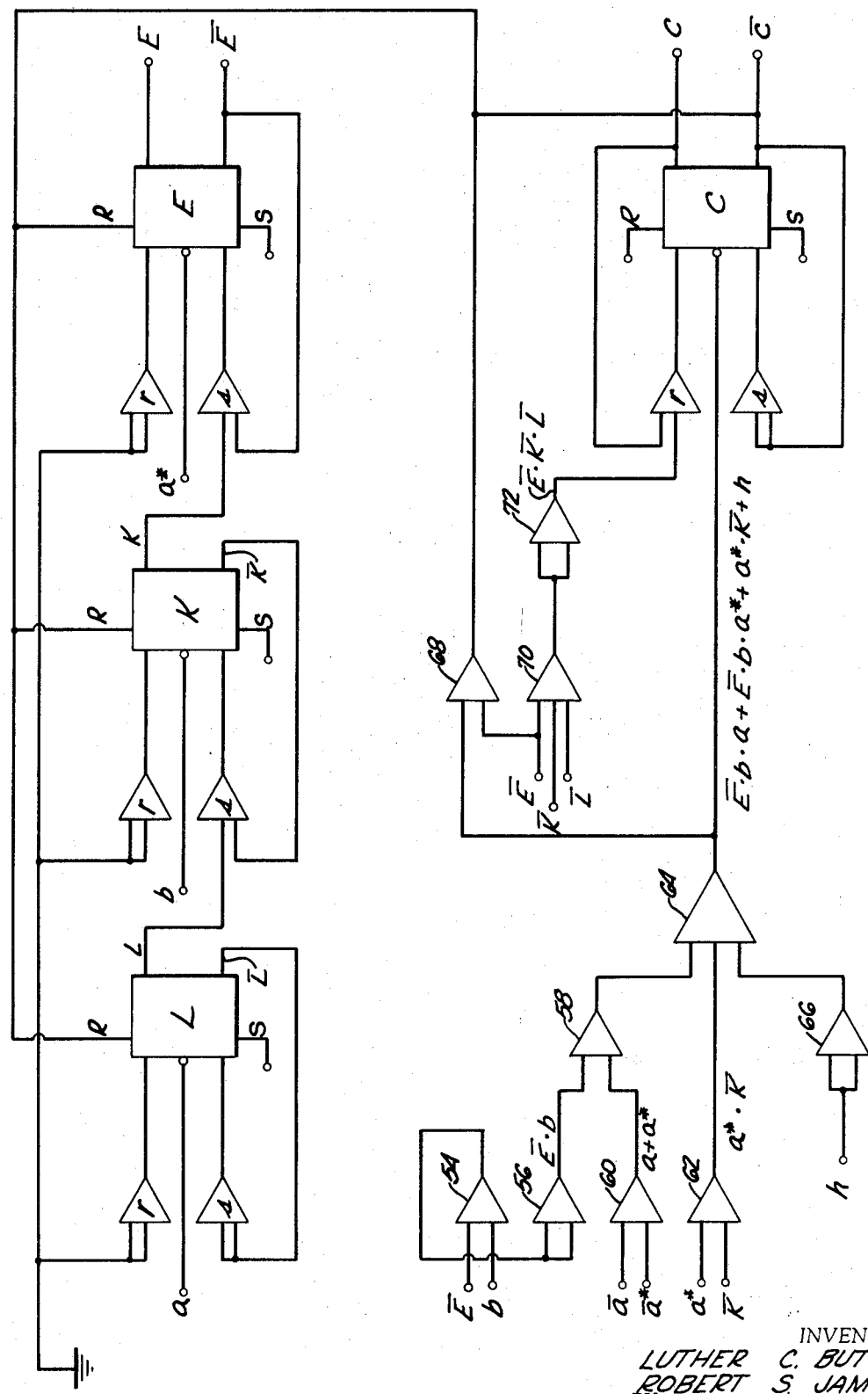
FIG. 5 illustrates circuitry for detecting relative phasing of two pulse trains.

The pre-enable and post-enable clears are provided respectively by a fast clear gate 68 and by the clear flip-flop C under the control of a plurality of NAND gates as shown in FIG. 5. The first of this series of gates, gate 54, has as its inputs the signals $\bar{E}$ and $b$. The output of gate 54 is fed to an inverter or second NAND gate 56 to provide the output $\bar{E} \cdot b$ which is fed as one of the inputs to a NAND gate 58. The second input to gate 58 comprises the quantity $a + a^*$ provided at the output of a NAND gate 60 having inputs $\bar{a}$ and $\bar{a}^*$ thereto. Logically, $\overline{\bar{a} \cdot \bar{a}^*} = a + a^*$. Still another NAND gate 62 having inputs $a^*$ and $\bar{K}$ provides an output $\overline{a^* \cdot \bar{K}}$ which is a first of three inputs to a three input NAND gate 64 that actually provides a logical OR function. Gate 64 has a second input from NAND gate 58 in the form of $\overline{\bar{E} \cdot b \cdot a +}$ $\overline{\bar{E} \cdot b \cdot a^*}$, and has a third input in the form of a signal $\bar{h}$ from a NAND gate 66 which has the signal $h$ applied as inputs thereto. Conventional logic notation is employed wherein the bar over a symbol indicates the quantity inverted (NOT), the plus (+) indicates OR and the dot($\cdot$) indicates AND.

It may be noted at this point that all of the necessary electrical leads connecting a signal generated at one point in the circuit to inputs of the various gates are not shown on the drawings in order to maintain maximum clarity. Alternatively, the various input and output terminals of the several components are labeled with the corresponding signals appearing threat. It will be readily understood that, for example, the signal $\bar{E}$ applied as one of the inputs to NAND gate 54 is obtained via a connecting lead, not shown, from the corresponding output labeled $\bar{E}$ of flip-flop E. So, too, the various inputs $a, b, a^*$ and the various NOT functions thereof are obtained from other terminals on this figure or other figures wherein these signals are generated. The signal $h$ is generated by the circuit of FIG. 6 to be described below.

The output of NAND gate 64 is fed as the clock or trigger input of clear flip-flop C which has its $\bar{C}$ output connected to the direct reset inputs of the sequence flip-flops L, K, and E. The circuit is arranged so that when flip-flop C is set, whereby $\bar{C}$ is low, the low signal at this terminal will reset, and hold in reset state, all of the sequence flip-flops L, K, and E. The clear flip-flop C has provided to the trigger input thereof the output of NAND gate 64 comprising the signal $\bar{E} \cdot b \cdot a + \bar{E} \cdot b \cdot a^* +$ $a^* \cdot K + h$. This same signal is fed to the fast clear NAND gate 68 which has as a second input thereto the signal $\bar{E}$. The output of gate 68 is fed to the direct reset terminals of the L, K, and E flip-flops.

The gating preceding the input of fast clear gate 68 operates when $\bar{E}$ is high to determine whether the sequence at the L, K, and E flip-flops will be permitted. When one of the input conditions of gate 64 causes the output of gate 64 to go high, the output of gate 68 goes low to reset the sequence flip-flops. Should there be any coincidence between pulses $b$ and $a$ or between pulses $b$ and $a^*$, the L, K, and E flip-flops are all cleared via fast clear gate 68. Also, if an $a^*$ pulse should occur before flip-flop K has been set, the signal $a^* \cdot \bar{K}$ will pass through gate 68 to reset all the sequence flip-flops. Accordingly, the several functions indicated as provided via gates 54, 56, 58, 60 and 62 are termed pre-enable clear signals since these are the signals that operate to clear the sequence flip-flops L, K, and E before the measurement interval has been initiated, that is, before the enable signal E has occurred. With flip-flop C reset, a sequence may be detected to signal (by E going high) the occurrence of the unique point of relative phasing and flip-flop C is ready to be toggled (set) by the fall of the end of measurement signal h. Gates 70, 72 ensure that the clear flip-flop will not be reset unless and until all of L, K and E are cleared as particularly described below.

Now, having identified the occurrence of the unique relative phase point, and having started the desired measurement (by enabling the circuit of FIG. 6) all of the flip-flops L, K, and E are in set condition and will so remain to continue the enable signal E until the measurement is terminated. Upon completion of the measurement interval, the signal $h$ is generated as will be more particularly described in connection with the description of the relative frequency sense detector. Signal $h$ is the "post-enable" clear that sets flip-flop C and causes L, K and E to be reset upon completion of a measurement.

After the unique relative phase point has been identified and the measurement interval has begun, the system proceeds to determine which clock is faster (unless the two frequencies are exactly equal). When this determination has been made, signal $h$, a short positive going pulse, is generated to initiate the post-enable clear operation. The signal $h$, fed via gates 66, 64, provides, upon its fall, a negative going signal to set flip-flop C which clears all flip-flops L, K, and E.

In order to ensure that all of the sequence flip-flops, L, K, and E are cleared before the start of a sequence or before beginning the search for a sequence, there is provided the NAND gate 70 having three inputs $\bar{E}, \bar{K}, \bar{L}$, and having its output inverted by a second NAND gate 72, to provide the logical output $E \cdot K \cdot L$, which is provided as one of the enabling inputs to the reset input gate of the clear flip-flop C. When clear flip-flop C is set ($\bar{C}$ is low), it prevents any of the sequence flip-flops L, K, and E from being set. The gates 70 and 72 prevent flip-flop C from being reset (to thereby permit detection of a sequence) until and unless all of the flip-flops L, K and E are cleared. When flip-flop C is set the clear signal $\bar{C}$ is fed to the sequence flip-flops L, K, and E. However, it is not desired to remove the $\bar{C}$ clear signal until it is certain that all of the flip-flops, L, K, and E have been reset. Therefore, when and only when such flip-flops are all reset, the trailing edge of one of the possible outputs of gate 64 is allowed to reset C and thus will allow a sequence detection to commence. With flip-flop C reset, if there should occur another one of the outputs from gate 64, the leading edge of such signal will reset the sequence flip-flops L, K and E via the fast clear gate 68. Its trailing edge will set flip-flop C which will then be reset by the next trailing edge of the next output of gate 64. On the other hand, with flip-flop C in reset condition, if a sequence now exists and detection of a sequence should now occur, the sequence flip-flops L, K and E will be set one at a time and the measurement interval will start with the fast clock detector of FIGS. 3 and 6 enabled. During the measurement interval, the first three outputs of gate 64, which involve either the signal $\bar{E}$ or $\bar{K}$, are all disabled so that only the signal h can possibly occur at the output of gate 64. The signal h cannot pass through the fast clear gate 68, since the latter is no longer enabled once the last of the sequence flip-flops, E, has been set. Accordingly, the trailing edge of the end of measurement signal h, and only the trailing edge of this signal, can set the clear flip-flop to reset all of the sequence flip-flops once a proper sequence has been detected. This is required because the trailing edge of h must be used for the clock switch and so the trailing edge of h must be the only way to turn off the enable E. Otherwise, h could possibly stop the measurement before the clock switch receives a proper signal.

If the two clock frequencies are precisely equal, it is likely that the circuit will never detect a sequence, or if it should, no end of measurement would be detected. No enable signal E would occur. In such situation, the clock last selected would continue to be employed for system output and the standby clock would be known to be in good condition.

Accordingly, the relative phase detector of FIG. 5 searches for and signals the occurrence of the unique condition of relative phases of the two clock pulse trains A and B and provides an enable signal E to thus signal a point at which a measurement is started.

FREQUENCY DIFFERENCE (SENSE DETECTOR)

It is now necessary to observe the succeeding relative phases of the two pulse trains, a and b, and in effect, to determine occurrence and direction of a change in the relative phases of the two clock pulse trains. One could determine the direction in which the pulse b goes with respect to the pulse a after the sighting pulse b has been located in the gunsight notch between a and a*. For a straightforward mechanization, if b is at a higher frequency than a, the next event after firing of the enable gate E is that, at some time later, the pulse b will begin to overlap pulse a so that the logic condition E·a·b would signify that the B is the faster clock. On the other hand, should b begin to move toward the right and overlap a* during an enable interval after the start of a measurement, the system should signal the condition E·b·a* indicating that clock B train is the slower of the two. In such arrangement the procedure for frequency comparison is to start out when there is a lack of coincidence and then look for the next condition of coincidence.

Nevertheless, the preferred procedure as mechanized in the direction sensing circuit of FIG. 6 does not actually employ the occurrence of the next coincidence, since it operates not to look for a coincidence, but in effect to look for the first occurrence of two consecutive pulses a that occur in a shorter time than that required for two consecutive pulses b. At the start of the measurement interval, the two pulse trains are in consecutive alternation and pulses such as a and b are closely adjacent. The relative frequency sense detector identifies which train of the two has a pulse that first occurs out of such consecutive order of alternating pulses and ends the measurement interval upon such occurrence.

The circuit employs a flip-flop F that is alternately toggled by the trailing edge of pulses a and b. At the unique point of relative phase, whenever a occurs, flip-flop F must be in the reset condition and whenever b occurs, F is in set condition, because a and b occur alternately. The circuit operates to determine when an extra one of b or a pulses has occurred, which means that a and b are no longer occurring alternately. That is, if some pulse a should occur when the flip-flop F is in set condition (it has not been reset by any succeeding pulse b) then it is known that an extra pulse a has occurred out of the alternating order of a and b. In such a situation, the coincidence of a and F, the circuit signals the end of the measurement and also indicates that the pulse train A is faster. On the other hand, should pulse b occur and find flip-flop F in the reset rather than in the set condition, it is known, in effect, that an extra pulse b has occurred; that is, one pulse b has occurred since the last time the flip-flop F was reset and before any subsequent pulse a had the chance to set the flip-flop. Accordingly, the coincidence of b and $\bar{F}$ signals the end of measurement and that B is faster. In other words, at the relative phase relation signalled by occurrence of the sequence a–b–a*, pulses a and b are not in coincidence and the trailing edges of these pulses occur in consecutive alternation, one after the other alternately setting and resetting flip-flop F. The end of measurement is manifested by these pulses occurring out of order. The first one that occurs out of the consecutive alternation is the faster. This method is mechanized by the circuit of FIG. 6.

As illustrated in FIG. 6, the fast clock detector comprises a flip-flop F that is, in effect, enabled by the signal E and is set or reset by the fall of pulse a and also set or reset by the fall of pulse b. The signals b and E are fed as inputs to a NAND gate 74 and thence via a delay 76, such as a 100 nanosecond delay, through an inverting NAND gate 78 to an input of the reset gate of flip-flop F. The delay may be provided by many different types of known devices, such as an even number of additional NAND stages, for example, where such gates are readily available in the integrated circuit chips employed in the mechanization. The signals E and a are fed to a NAND gate 80 and thence, without any delay to a NAND gate 82 which provides one of the inputs to the set gate of flip-flop F. The signal $\overline{E \cdot a}$ and the delayed signal $\overline{E \cdot b}$ are each fed to a NAND gate 84 (logical OR) which feeds the trigger input of flip-flop F, whereby the latter will be toggled by either a or b (delayed) in the presence of the enable signal E. The signals E·b and E·a from gates 78 and 82 are also fed to additional NAND gates 85 and 86 respectively receiving as second inputs the outputs of $\bar{F}$ and F from the flip-flop F. The outputs of the last mentioned gates are fed to NAND gates 88 and 90 to produce the signals p and q, respectively, indicating the conditions clock B fast and clock A fast respectively. The outputs of both of gates 85 and 86 are fed to an end-of-measurement NAND gate 92 (logical OR) which provides the signal h that signifies the end of the measurement. It will be recalled that this is the signal that is fed to gate 66 of FIG. 5 to effect the post-enable clear operation.

Pulses representing conditions of the operation of the fast clock detector of FIG. 6 are shown in FIGS. 7a, 7b, 7c and 7d. It will be noted that in FIG. 7a the pulse train b is actually delayed with respect to the pulse train a by the 100 nanosecond delay provided by delay device 76, although such interval is not illustrated in the drawing. The delay in this pulse train for this circuit is employed because there can be some overlap even though the sighting pulse is in the gunsight notch. The delay is a safeguard somewhat similar to the pulse narrowing of the sighting pulse b referred to earlier in this description. The effect of this delay circuit is equivalent to the narrowing of the pulse of b, but is more readily and more repeatably achieved. Note that a significant delay, in the order of one-eighth of the pulse width, is employed here. The exact value of the delay, pulse widths or frequencies employed may, of course, be varied considerably in the mechanization of the invention. In effect, it is necessary, in this particular situation, only to separate the pulse b from pulse a such that when the enable signal E is first turned on, the measurement is not destroyed by threshold overlap or noise. Flip-flop F has a direct reset input from the signal $\bar{C}$ of the clear flip-flop of FIG. 5 whereby flip-flop F is reset at any time that the L, K, and E flip-flops are reset by the clear flip-flop.

Flip-flop F is caused to change its state at the fall of the input signal thereto, at the trailing edge of each of the pulses a, b, and E. Thus in each instance, F will go high when a falls and F will fall when b falls. Actually, the pulse F under the illustrated conditions would be considerably longer than either pulse a or b since it is initiated upon the fall of a, continues for the duration of the 100 nanosecond delay, and the occurrence of b, and falls only upon the fall of b.

FIG. 7a illustrates the position of pulses b relative to pulses a at the start of a measurement and FIG. 7b shows these pulses at sometime later for the situation where clock A is faster than clock B. Thus, in effect, the pulses a are moving relatively to the left in the drawing, and pulse b is moving toward the right as indicated by the arrows. Note that pulse F rises on the fall of a and falls on the fall of b. In FIGS. 7a and 7b the pulses a and b are in consecutive alternation. In FIG. 7c is illustrated the condition of end-of-measurement for the situation where clock A is faster than clock B. Note that pulse a has moved sufficiently to the left with respect to pulse b that it rises out of the alternating order. Thus a has already risen before b (and F) falls. Accordingly, the pulse h is produced by the coincidence of a and F. The logical condition $\overline{E \cdot a \cdot F}$ is fed from the output of gate 86 as both inputs to NAND gate 90 which inverts its input and provides the logical signal at its output $E \cdot a \cdot F$. This is the signal q. Similarly, NAND gate 88 which has both inputs provided by the quantity $\overline{E \cdot b \cdot \bar{F}}$ provides at its output the logical signal $p = E \cdot b \cdot \bar{F}$. As previously described, the NAND gates employed herein are inverting AND gates for positive signals, that is, when all the inputs thereto are high, the output thereto is low. They are inverting OR gates for negative signals. That is, when any one input thereto is low, the output thereto is high. Accordingly, gate 92 which receives inputs from both gates 85 and 86 provides the OR'd signal $h = E \cdot a \cdot F + E \cdot b \cdot \bar{F}$.

FIG. 7d illustrates the relative phasing of a and b pulses at an end-of-measurement interval where clock B is faster than clock A. Thus as indicated by the arrows in this figure, the pulse a is moving toward the right relative to the pulse b. In this situation, since F goes high only upon the fall of a, b goes high before F goes high. Thus b and $\bar{F}$ will exist in coincidence with the enable signal E to produce the signal p at the output of NAND gate 88, signalling the fact that clock B is faster than clock A. As previously described, upon the fall of h pulse, the clear flip-flop C of FIG. 5 is set to thereby reset the sequence or gunsight trio L, K, E, whereby the signal E falls as illustrated in FIG. 7d.

The clock switch 30 of FIG. 3 comprises the flip-flop H as shown in FIG. 6, having a clock input form the signal h. The reset input gate of flip-flop H has one input in the form of the signal p and a second input from the true output thereof. This flip-flop, whenever it is set, will be toggled to its other state by the occurrence of p, the indication that clock B is fast. The set gate of this flip-flop has a first enabling input from the flip-flop false output $\bar{H}$, and a second enabling input from the A fast signal, q, whereby the flip-flop will be switched from reset to set condition upon the occurrence of the signal q.

Operation of flip-flop H is also illustrated in FIGS. 7a through 7d. In FIGS. 7a, 7b and 7c illustrating the situation of clock A fast, the signal H is shown to be high since it is assumed that prior to the indicated measurement, clock A had been indicated to be the faster of the two. Accordingly, upon the end of such a measurement showing that clock A is still the faster, the signal H remains unchanged. Starting with such a situation, where clock A is fast, FIG. 7d illustrates the situation that occurs if clock B should become the faster. In this situation, the signal p will cause flip-flop H to be switched from its set to its reset condition, and as shown in FIG. 7d, H falls upon the fall of signals h and p. It is significant to employ the trailing edge of h signal to terminate the measurement interval since, otherwise, earlier resetting of the sequence flip-flops could turn off flip-flop F before flip-flop H, the clock switch, has been toggled by the h signal. Note that flip-flop H, like all other flip-flops is toggled on the trailing edge of the clock input thereto. Thus, it is important to keep flip-flop F from changing until H has had a chance to be changed, if such a change is to occur.

If one of the bad clock detectors 34 and 36 of FIG. 3 should detect that the clock under observation is bad, a signal is fed therefrom to the direct set or direct reset terminal of flip-flop H to ensure that flip-flop H remains in a condition wherein it cannot switch the bad clock to the output. Thus, there is a direct reset input to flip-flop H from the clock detector 34 when clock A is bad and a direct set input to the flip-flop from the detector 36 when clock B is bad.

Accordingly, H is high whenever clock A is the faster, and $\bar{H}$ is high whenever clock B is the faster. The signals H and $\bar{H}$, respectively enable NAND gates 94 and 96, each having a second input thereto directly from the clock generators, 10 and 12 (FIG. 3) in the form of the pulse trains A and B, respectively. One of these pulse trains is switched through NAND gate 98, which operates for the negative input signal thereto as an OR gate, to provide the selected clock output in the form of the signal $z = H \cdot A + \bar{H} \cdot B$. Thus the pulse train A or B is provided at the output depending upon which clock has been determined to be the faster of the two by the system described herein. Signal z is the system output, the clock train from the faster clock.

It will be readily appreciated that the gates 94, 96, and 98 operated under control of clock switch flip-flop H may, alternatively, be employed to switch the divide-by-five pulse trains a and b rather than the clock trains A and B. However, the arrangement illustrated is preferred from the standpoint of increased reliability since failure of the divide-by-five counter in the illustrated arrangement is not reflected in the output of the chosen clock pulse. If the pulse trains a or b were to be switched by the flip-flop H, and the divide-by-five counter should fail, the pulses being fed could be of a considerably different frequency. With the arrangement illustrated, failure of the divide-by-five counter would not affect the frequency of the output signal z although it would be possible that the slower clock output was actually being provided at the output.

An alternative approach to that illustrated in FIG. 6 would be to use signal E to enable a series of gates that would sense conditions of coincidence of pulse b with pulses a or a*. For frequency of B higher, a coincidence gate would sense a and b. For frequency of B lower, another coincidence gate would sense a* and b. In other words, for an indication of the end-of-measurement, it is only necessary to sense the overlap of the sighting pulse b with either of the gunsight interval pulses a or a*. Nevertheless, the arrangement illustrated employing flip-flop F requires a fewer stages of gating and exhibits improved immunity to noise. This is true because the flip-flop F acts, in effect, as a pulse shaper each time it is toggled, and its operation has no relation to input pulse shapes, whereas coincidence gates, working on coincidence of $a \cdot b$ or $b \cdot a^*$, would operate on the direct input pulses unless additional circuitry were employed to improve the wave shape, which, of course, would require additional circuits. Another alternative solution to this problem of detecting the faster clock may be understood with reference to FIGS. 7c and 7d. If A is faster, the overlap of the trailing edge of b with the leading edge of a will occur first. If B is faster the leading edge of b will first overlap the trailing edge of a. In effect, the illustrated mechanization performs both of the above alternative functions since the described conditions of overlap will exist at the end of measurement signalled by occurrence of h.

It will be seen that the circuitry of FIG. 5 identifies a unique, precisely repeatable and unambiguous point of relative phasing of the two clock signals. This point is employed to initiate the measurement. The termination of the measurement is also precise, repeatable and unambiguous to provide a positive, well defined stop. It is noted that a precise quantitive measure of the magnitude of the frequency difference is not required to determine which of the clocks is the faster. Only a qualitative measure is needed to signal the sense of the difference. Having determined which clock is faster, the actual measurement interval, that is, the interval in which the sense of the frequency difference is measured, may be terminated. Although only a qualitative indication of frequency difference, namely, the sense of the difference, is necessary for sensing which of the two clocks is the faster, the occurrence of signal h does provide an accurate and precise representation of the end of the measurement interval. Where a quantitative measure of frequency difference is also required, any of the signals E, h, p or q may be counted to indicate intervals between such signals, successive ones of or between different signals, as between E and h, for example. The interval between successive occurrences of the rise of E, the enable signal is a precise, repeatable, and unambiguous indication of a relative phase point. Accordingly, a count of the number of initiations of the enable signal E within any fixed time interval provides a measure of the difference between frequencies of the two clocks. A similar measure is available by counting signals h, which also identify a unique relative phase point.

SLOW CLOCK MONITOR

Signals h, p, and q conveniently may be employed to indicate the start of a period that is a measure of the frequency difference for the purpose of making relatively gross measurement on the slower clock, thus an alarm may be turned in if such slower clock should exceed predetermined tolerance limits. Even if the slower clock is not being used, if it should be too slow to use in an emergency, there would be a loss in clock redundancy upon failure of the fast clock. Accordingly, the slow clock monitor circuitry of FIG. 8 is provided to turn in an alarm indicating when either of the clocks is too slow for use in the system. The arrangement of FIG. 8 comprises a timed flip-flop that is effectively a monostable multivibrator that initiates a predetermined time interval upon the occurrence of the end-of-measurement interval signalled by h. If the next signal h should occur before the predetermined interval defined by the monostable multivibrator timer, the period of the frequency difference is too small whereby the frequency difference is too high and an alarm is turned in identifying the slow clock. This measurement of frequency difference is made relative to the fast clock, whereby too great a difference indicates the standby clock to be too slow. As shown in FIG. 8, the slow frequency monitor 32 comprises a flip-flop T substantially identical to all the other flip-flops described herein, except as described below, and having a reset input gate 100 and a set input gate 102 each of which is substantially identical to all the other set and reset gates of the other flip-flops. The reset gate 100 of this flip-flop is illustrated in detail in FIG. 8 in order to explain the operation of connections to this gate which caused the flip-flop to operate as a monostable device. A set gate 102 of flip-flop T has a first enable input from the output $\overline{T}$ and a second enable input from the signal h. The flip-flop toggling or clock input is provided from the signal z. The toggle or clock input is actually applied to both input gates and directly to other circuitry of the flip-flop as specifically shown in circuit diagrams provided by the above identified manufacturers. The reset gate as previously indicated is identical to all the other set and reset gates, and comprises three input diodes 104, 106 and 108, having their cathodes connected to receive the specified input signals and having their anodes connected in common to the junction of a resistor 110 and the base of a NPN transistor 112. The base and collector of transistor 112 are connected to a source of potential +V through resistors 110 and 116, respectively. The emitter of transistor 112 is connected to ground through a resistor 120. The output of the reset gate is provided at the emitter of the transistor, and is connected to cause the flip-flop to be reset upon fall of clock input $z$. The first input diode 104 of the reset gate is connected to a capacitor 122 that has the other side connected to ground. Capacitor 122 has the gate input side thereof connected to the T output of flip-flop T via a diode 124 and a resistor 126 whereby the capacitor is shunted and prevented from charging when the signal T is low. The signal T at the output of the flip-flop is returned to the input diode 106 of the reset gate and the triggering input diode 108 and other circuitry of the flip-flop receive the input signal $z$ which is the output of the selected clock.

The output T of the timer circuit is fed as the first input to each of a pair of interval comparators comprising NAND gates 128 and 130, each of which receives as a second input the clock signal $z$, and which respectively receive as a third input, the end-of-measurement interval signal $p$ or $q$, respectively, depending upon which clock is the faster. The outputs of gates 128 and 130 are inverted in gates 132 and 134, respectively, to provide the alarm signal indicating clock A too slow or clock B too slow.

In operation of the slow clock monitor of FIG. 8, it will be noted that when flip-flop T is reset, T is low and the capacitor 122 cannot be charged (from +V via resistor 110 and diode 104). On the other hand, the reset input gate will be enabled when T is high if capacitor 122 has charged sufficiently to provide a high signal at the cathode of input diode 104. In such enabled condition, when clock signal $z$ falls, the reset gate operates to reset the flip-flop. It will be seen that when the cathodes of all the input diodes 104, 106 and 108 are high, the base of transistor 112 becomes more positive to cause the transistor to conduct, providing a high signal at its emitter. When the triggering signal $z$ falls, transistor 112 is cut off to provide at its emitter a negative going signal. With the flip-flop T in reset condition, the occurrence of an end-of-measurement signal $h$ enables its set gate. Now, upon the fall of the clock signal $z$, the flip-flop is set and thereby initiates a slow frequency measurement. When flip-flop T is set, the signal T is high and gates 128 and 130 are enabled by T and during each signal $z$. Accordingly, if the next end-of-measurement signal $p$ or $q$ should occur while T is still high, a signal will be passed by either gate 128 or 130 to indicate the slower clock is too slow. On the other hand, if flip-flop T should time out and reset before the occurrence of a second successive end-of-measurement interval $p$ or $q$, neither of gates 128 nor 130 will be enabled when such second signal occurs and no alarm is provided.

With the flip-flop T set, T signal is high and capacitor 122 can charge from +V through resistor 110 and diode 104 each time that signal $z$ goes high. When $z$ is low the charging current of the capacitor is shunted. That is, the capacitor 122 will charge in increments during each clock interval, when $z$ is high. Stated in another way, the circuit is a clocked monostable multivibrator. After a number of clock signals $z$, the charge on capacitor 122 rises sufficiently to cut off input diode 104 whereby upon the trailing edge of $z$ the reset gate 100 provides a negative going reset signal to reset flip-flop T and end its time interval. When T drops it discharges capacitor 122 through the current limiting resistor 126. As previously indicated, if the timing circuit times out before the next occurrence of $p$ or $q$, no alarm signal is forthcoming. On the other hand, if during the timing interval of the circuit of FIG. 8, the signal $p$ or $q$ should occur, it is known that the standby clock is too slow and an alarm is provided.

Operation of the timing circuit of FIG. 8 is illustrated by the pulse train conditions of FIGS. 9 and 10, wherein FIG. 9 indicates the relative timing of pulses $h$, $q$, or $p$ and T for the condition in which the standby clock is within tolerance limits. For the condition wherein the standby clock is too slow and an alarm signal is to be provided, FIG. 10 shows the relative timing of pulses $h$, $q$, or $p$ and T. FIG. 10 shows the second of two successive pulses $q$ or $p$ will occur before the end of the time interval for a bad clock. In FIG. 9 the timed interval ends before the repetition of input pulse $q$ or $p$. The time interval of the timer, determined by capacitor 122 and resistor 110 together with the circuit bias, is set for the maximum acceptable period of frequency difference.

BAD CLOCK DETECTOR

The bad clock detectors 34 and 36 are responsive to pulse trains $a$ and $b$ and similar bad clock detectors (not shown) may be provided that will be responsive to pulse trains $a$ and $b$. Each comprises a circuit that is fundamentally a two-stage counter as illustrated in FIG. 11. The counter comprises a pair of flip-flops U and V, identical to each of the other flip-flops described herein, with the output of U being fed to toggle flip-flop V whereby the two flip-flops will count from 1 through 4 in binary notation as is well known. The first flip-flop U is toggled by the signal $b^*$ provided from the phase reference or notch generator 24 of FIG. 3. Accordingly, each time the $b^*$ pulse occurs, flip-flop U changes state and each time the latter is set, the flip-flop V is switched. The pulse train $a^*$ is fed to the direct reset terminal of flip-flop U via a NAND gate 136 and a capacitor-resistor circuit 138, 140 whereby the flip-flop U will be reset upon occurrence of each pulse $a^*$. The count of three output is generated by the output of flip-flops U and V via a NAND gate 142 to provide an output if and only if the bad clock detector is allowed to count to three. Thus it will be seen that if the detector counts three pulses from $b^*$ before flip-flop U gets a clear pulse $a^*$ from the A clock, the latter is bad. Similarly, for monitoring the B clock, the pulse train $a^*$ is applied to the set and reset gates of the U flip-flop of the bad clock detector for checking the B clock and the $b^*$ pulses are applied to the clear gate 136. The output of the NAND gate 142, indicating that the monitored A clock is bad, is fed to the direct reset input of the memory clock switch H of FIG. 6. The output of the bad clock detector 36 is fed to the direct set input of clock switch H. Thus the bad clock output cannot form the system output. These circuits, provided basically to monitor the clock generators, will inherently monitor the phase reference generators also, since the latter generate trains $a$ and $a^*$, and $b$ and $b^*$. Although a bad clock detector circuit that alarms on four but not on three counts of pulses from one clock (without an intervening pulse from the other) is shown for purposes of exposition, it will be readily understood that circuits accepting other maximum allowable counts may be employed as deemed necessary or desirable.

The system is arranged so that the bad clock detector (FIG. 11) will identify a bad clock, and thus cause the clock switch to be held in its appropriate state, before the relative phase detector 26 ceases to operate. The latter will not operate if the frequency of the sighting pulse train $b$ goes so low (with concomitant increase in pulse width) that the enable sequence detector will not work. This will occur if pulse $b$ becomes too wide to fit into the reference interval between the pair of pulses $a$ and $a^*$. Thus before the gunsight pulse becomes too wide (as its frequency decreases) this pulse train should be identified and locked out. Similarly, the slow frequency monitor of FIG. 8 will not operate if pulse $b$ is too wide to permit the sequence detector to enable.

SUMMARY

There has been described a redundant clock timing system wherein two clocks are compared and the faster of the two clocks is detected and employed to provide an output while continuously monitoring the frequency and other parameters of operability of the standby clock. A unique precision frequency comparison and relative frequency measurement is provided by generating as a point of phase reference a series of pairs of pulses from one clock separated by an interval not substantially less than the width of a pulse generated from the second clock. Thus when a pulse from the second clock occurs within the interval between the pulses of a pair of sighting pulses, a unique, precisely repeatable and unambiguous relative phase reference point has been determined and a precise beginning of a measurement interval is signalled. The measurement interval is uniquely, precisely and unambiguously terminated, and the faster clock identified, when signals from the two clocks occur out of the order of the consecutive alternation that exists at the start of the measurement interval.

The foregoing detailed description is to be clearly understood as given by way of illustration and example only, the spirit and scope of this invention being limited solely by the appended claims.

We claim:

1. Frequency comparing apparatus comprising first and second oscillators,
   means responsive to said first oscillator for generating a first train of pulses,
   means responsive to the second oscillator for generating second and third trains of pulses, pulses of one of said second and third trains being separated with respect to pulses of the other so as to provide an absence of both for an interval approximately equal to the width of pulses of said first train, and
   relative phase means responsive to said trains of pulses for indicating occurrence of a pulse of said first train in the interval between a pulse of said second train and a pulse of said third train.

2. Frequency comparing apparatus comprising first and second oscillators,
   means responsive to said first oscillator for generating a first train of pulses,
   means responsive to the second oscillator for generating second and third trains of pulses, pulses of one of said second and third trains being separated with respect to pulses of the other by an amount approximately equal to the width of pulses of said first train,
   relative phase means responsive to said trains of pulses for indicating occurrence of a pulse of said first train in the interval between a pulse of said second train and a pulse of said third train,
   means for detecting the sense of the relative frequency of said oscillators, and
   means responsive to said relative phase means for enabling said sense detecting means.

3. In combination
   a first periodic generator,
   a second periodic generator,
   means responsive to said first generator for generating a series of pairs of pulses of which the leading edge of one follows the trailing edge of the other by a gunsight interval, means responsive to said second generator for generating a series of sighting pulses having a duration not substantially greater than said gunsight interval, and
   means responsive to said pulses for indicating occurrence of a sighting pulse in one of said gunsight intervals, to thereby signal occurrence of a precise phase relation between said periodic generators.

4. The apparatus set forth in claim 3
   wherein one pulse of each pair of said series of pairs and pulses of said sighting pulses comprise
      first and second signals that occur in consecutive alternation at said phase relation between said periodic generators, and
      means for signalling occurrence of one of said signals out of said consecutive alternation.

5. The apparatus of claim 4 including
   means for signalling which of said first and second signals first occurs out of said alternation.

6. In combination
   a first periodic generator,
   a second periodic generator,
   means responsive to said first generator for generating a series of pairs of pulses separated from each other by a gunsight interval,
   means responsive to said second generator for generating a series of sighting pulses having a duration not substantially greater than said gunsight interval,
   means responsive to said pulses for indicating occurrence of a sighting pulse in one of said gunsight intervals, to thereby signal occurrence of a precise phase relation between said periodic generators,
   means for initiating a measurement interval upon said occurrence, and
   means for terminating said measurement interval when said sighting pulse moves out of said gunsight interval.

7. In combination
   a first periodic generator,
   a second periodic generator,
   means responsive to said first generator for generating a series of pairs of pulses separated from each other by a gunsight interval, means responsive to said second generator for generating a series of sighting pulses having a duration not substantially greater than said gunsight interval, means responsive to said pulses for indicating occurrence of a sighting pulse in one of said gunsight intervals, to thereby signal occurrence of a precise phase relation between said periodic generators, means for indicating overlap of a sighting pulse with one of the pulses of a pair of said series of pulse pairs, and means responsive to said overlap indicating means for initiating another search for occurrence of said sighting pulse in one of said gunsight intervals.

8. The structure of claim 7 including
means for indicating occurrence of a sighting pulse between successive pairs of said series of pairs, and
means for initiating a new search upon said last mentioned occurrence.

9. In combination
a first periodic generator,
a second periodic generator,
means responsive to said first generator for generating a series of pairs of pulses separated from each other by a gunsight interval
means responsive to said second generator for generating a series of sighting pulses having a duration not substantially greater than said gunsight interval,
means responsive to said pulses for indicating occurrence of a sighting pulse in one of said gunsight intervals, to thereby signal occurrence of a precise phase relation between said periodic generators, and
relative frequency sense detecting means for selecting one of said periodic generators according to whether the leading or trailing edge of the sighting pulse overlaps respectively the trailing or leading edge of a pulse of said pair after occurrence of said precise phase relation.

10. Timing apparatus comprising
first and second oscillators having nominally equal frequencies,
means for comparing the frequencies of said oscillators,
means for selecting the oscillator having the higher frequency.
said means for comparing frequencies of said oscillators comprising
means for generating first and second end-of-measurement signals respectively indicating one or the other of said oscillators is determined to be slow, said apparatus further including
a timer for generating a predetermined time interval,
first and second interval comparators, each having a first input from said timer, and
means responsive to respective ones of said end-of-measurement signals for enabling the first and second comparators and responsive to the occurrence of each of said end-of-measurement signals for initiating operation of the timer, whereby one or the other of said comparators will provide an output when the interval between successive occurrences of said end-of-measurement signals is smaller than the time interval generated by the timer.

11. The method of comparing frequencies of two pulse trains comprising the steps of
initiating a measurement interval in response to pulses of the two trains occurring in consecutive alternation and in close adjacency,
terminating the measurement interval upon the first occurrence of one of said pulses out of consecutive alternating order, and
indicating the time between successive occurrences of said interval to thereby indicate magnitude of the frequency difference between said trains.

12. Timing apparatus comprising
a first clock generator,
a second clock generator,
a reference interval generator responsive to the first clock generator for producing a series of pairs of reference interval pulses separated from each other by a reference interval,
a sighting pulse generator responsive to the second clock generator for generating a sighting pulse having a width not substantially greater than said reference interval,
relative phase detecting means responsive to said reference interval and sighting pulse generators for detecting the occurrence of one of said sighting pulses within one of said reference intervals,
relative frequency sense detecting means responsive to said relative phase detector and to said reference interval and sighting pulse generators for signalling the end of a measurement interval upon occurrence of one of the sighting pulses out of alternation with one of the pulses of a pair of reference interval pulses, and
a clock switch responsive to said relative frequency sense detecting means and to said first and second clock generators for providing an output from the faster of said clock generators as determined by the relative frequency sense detector.

13. The timing apparatus of claim 12 including
a slow frequency monitor responsive to said relative frequency sense detector and to the output of said clock switch for providing an alarm when the frequency of one of said clock generators is below a predetermined tolerance value.

14. The timing apparatus of claim 13 including
a plurality of bad clock detectors for indicating the absence of a clock pulse from one of the clock generators during the occurrence of a predetermined number of consecutive pulses from the other of the clock generators.

15. The apparatus of claim 12 wherein said relative phase detecting means comprises
sequence detecting means for detecting the occurrence in a consecutive sequence of a first one of the pulses of a pair of reference interval pulses, a sighting pulse, and the other one of the pair of reference interval pulses.

16. The timing apparatus of claim 15 wherein said relative phase detecting means includes
means for disabling said sequence detecting means upon occurrence of predetermined improper conditions.

17. The timing apparatus of claim 16 wherein said disabling means includes
    means responsive to overlap of a portion of said sighting pulse with a portion of one of the pulses of a pair of reference interval pulses, and
    means for disabling the sequence detecting means upon occurrence of the second pulse of a pair of said pairs of pulses prior to occurrence of a sighting pulse during any sequence detection.

18. The timing apparatus of claim 16 wherein said means for disabling said sequence detecting means comprises
    means responsive to said relative frequency sense detecting means for clearing said relative phase detecting means to enable search for another sequence.

19. The timing apparatus of claim 18 wherein said relative frequency sense detecting means comprises
    a flip-flop having toggling inputs from said sighting pulses and from one pulse of each pair of said reference pulses,
    means for indicating coincidence of the respective states of said flip-flop with respective ones of said toggling input pulses, and
    means responsive to either one of said coincidences for clearing said sequence detector thereby to indicate termination of a measurement interval and permit the search for a new sequence.

20. Apparatus for comparing frequency of first and second oscillators comprising
    reference interval generating means responsive to said first oscillator for generating a series of pulse pairs with the pulses of each pair separated from each other by a reference interval and successive pairs of pulses separated from each other by a second interval,
    means responsive to the second oscillator for generating a train of sighting pulses,
    relative phase detector means comprising
        first, second, and third flip-flops each having a trigger input, a direct reset input, a set input, a reset input, and an output,
        means for connecting the first pulse of each of said pairs to the trigger input of the first flip-flop,
        means for connecting the output of the first flip-flop to the set input of the second flip-flop and connecting the sighting pulses to the trigger input of the second flip-flop,
        means for connecting the output of the second flip-flop to the set input of the third flip-flop and means for connecting the second pulse of each pair to the trigger input of the third flip-flop,
        a clear flip-flop having an output connected to the direct reset inputs of each of said first, second, and third flip-flops, and having trigger set and reset inputs,
        a first coincidence gate (64) having a first input representing coincidence of a sighting pulse with either pulse of a pair of said pairs of pulses, having a second input indicative of occurrence of the second pulse of a pair of said pairs of pulses in coincidence with the reset condition of said second flip-flop,
        a second end-of-measurement gate (66), said first gate having a third input from said end-of-measurement gate,
        a third fast clear coincidence gate (68) having a first input from the false output of said third flip-flop, having a second input from the output of said first coincidence gate (64), and having an output connected to the direct reset inputs of said first, second, and third flip-flops,
        a fourth inhibit coincidence gate (70) having inputs from the false outputs of each of said first, second, and third flip-flops and having an output inverted to the reset input of said clear flip-flop,
        said trigger input of said clear flip-flop being connected to the output of said first coincidence gate (64),
    relative frequency sense detecting means comprising
        a fifth flip-flop having set and reset inputs, a direct reset input, a trigger input, and true and false outputs,
        a fifth coincidence gating means (74, 78, 80, 82) for providing to the reset input of the fifth flip-flop a delayed signal representing coincidence of the sighting pulse and the true output of said third flip-flop, and for providing to the set input of the fifth flip-flop a signal representing coincidence of the true output of the said third flip-flop and one pulse of a pair of said pulses,
        means (84) for causing said fifth flip-flop to be toggled whenever either said sighting pulse or said one of said pulses of a pair occurs in coincidence with a true output of said third flip-flop,
        a sixth coincidence gate (85) for indicating coincidence of a false output of the fifth flip-flop, a true output of the third flip-flop, and a sighting pulse, to produce a signal $p$ indicating said second oscillator to be faster than said first oscillator,
        a seventh coincidence gate (86) for indicating coincidence of true outputs of the third and fifth flip-flops and said one of said pulses of a pair to produce a signal $q$ indicating said first oscillator to be faster than said second oscillator,
        an OR gate (92) for indicating occurrence of either of said signals $p$ or $q$, and
        means responsive to said OR gate (92) for providing an input to said end-of-measurement gate (66).

21. The apparatus set forth in claim 20 including
    a memory flip-flop having set and reset inputs, direct set and direct reset inputs, a trigger input, and true and false outputs,
    means for providing said signal p from said sixth gate (85) to the reset input of said memory flip-flop,
    means for providing said output $q$ of said seventh gate (86) to the set input of said memory flip-flop,
    means responsive to either said $p$ or said $q$ signal for providing a trigger input to said memory flip-flop,
    an eighth coincidence gate (94) having a first input from the true output of said memory flip-flop and having a second input from one of said oscillators,
    a ninth coincidence gate (96) having a first input from the false output of said memory flip-flop and having a second input from the other of said oscillators, and
    means for providing at the output of said apparatus the output of one of said eighth (94) or ninth (96) gates.

22. The apparatus as set forth in claim 21 including a first bad clock detector for indicating failure of one of said oscillators, a second bad clock detector for indicating failure of the other of said oscillators, means responsive to said first bad clock detector for providing an input to the direct set input of said memory flip-flop, and means responsive to the second bad clock detector for providing an input to the direct reset input of said memory flip-flop.

23. Apparatus for comparing frequencies of first and second pulse trains comprising means for initiating a measurement interval when pulses of said trains occur in a unique relation of consecutive alternation, means for thereafter terminating said measurement interval when pulses of said trains occur out of such consecutive alternation, and means for indicating the time between successive occurrences of said measurement interval to thereby indicate the magnitude of the difference in frequency between said trains.

24. The apparatus of claim 23 including means for detecting which one of said trains includes a pulse that first occurs out of such consecutive alternation, to thereby detect which train is of higher frequency.

25. The apparatus of claim 24 including means for measuring the time interval between the detection of said first mentioned means and the detection of said second mentioned means.

26. The apparatus of claim 24 wherein said first train comprises a series of pairs of pulses and wherein said first mentioned means for detecting comprises sequence detecting means for signalling occurrence of a pulse of said second train between pulses of a pair of pulses of said first train.

27. Timing apparatus comprising first and second oscillators having nominally equal frequencies, means for comparing the frequencies of said oscillators, said means comprising means for signalling occurrence of a unique phase relation between the signals produced from said oscillators and means for signalling a change in said unique phase relation, said last mentioned means including means for indicating which of said oscillators has the higher frequency, output means, and selector means responsive to said frequency comparing means for feeding to said output means the signal produced by that one of said first and second oscillators that is indicated to have the higher frequency.

28. Timing apparatus comprising first and second oscillators having nominally equal frequencies, means for comparing the frequencies of said oscillators, and means for selecting the oscillator having the higher frequency, said comparing means comprising means responsive to one of said oscillators for generating pairs of gunsight pulses, with the pulses of each pair separated from each other by a reference interval, means responsive to the other of said oscillators for generating a train of sighting pulses, relative phase detecting means for indicating occurrence of one of said sighting pulses within one of said reference intervals, and means responsive to said relative phase detecting means for indicating the sense of the frequency difference between said oscillators, said oscillator selecting means comprising a clock switch having an input from both of said oscillators, and means responsive to said sense indicating means for operating said clock switch to select one of said oscillators.

29. The apparatus of claim 27 including means for measuring the difference in frequency between said oscillators, and means for signalling a frequency difference greater than a predetermined magnitude.

30. The apparatus of claim 29 wherein said means for comparing said oscillators comprises means for indicating a selected relative phase point of said oscillators, means for generating a predetermined time interval, and means for comparing said time interval with the interval between successive occurrences of said relative phase point.

* * * * *